(12) United States Patent
Peng et al.

(10) Patent No.: US 12,321,049 B2
(45) Date of Patent: Jun. 3, 2025

(54) OPTICAL DEVICE INCLUDING A GRATED OPTICAL WAVEGUIDE TO IMPROVE MODULATION EFFICIENCY

(71) Applicant: Hewlett Packard Enterprise Development LP, Houston, TX (US)

(72) Inventors: Yiwei Peng, Milpitas, CA (US); Yuan Yuan, Milpitas, CA (US); Stanley Cheung, Milpitas, CA (US); Zhihong Huang, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 141 days.

(21) Appl. No.: 17/815,403

(22) Filed: Jul. 27, 2022

(65) Prior Publication Data

US 2024/0036365 A1    Feb. 1, 2024

(51) Int. Cl.
*G02F 1/025* (2006.01)
*G02B 6/12* (2006.01)
(Continued)

(52) U.S. Cl.
CPC ......... *G02F 1/025* (2013.01); *G02B 6/12004* (2013.01); *G02F 1/0152* (2021.01); *G02B 6/34* (2013.01)

(58) Field of Classification Search
CPC .............................. G02F 1/025; G02F 1/0152
See application file for complete search history.

(56) References Cited

U.S. PATENT DOCUMENTS 6,268,953 B1 * 7/2001 Maloney ................. G02F 1/015
  359/321
6,327,396 B1 * 12/2001 Harpin ..................... G02F 1/025
  385/9

(Continued)

FOREIGN PATENT DOCUMENTS

WO       2021/250098 A1    12/2011
WO    WO 2015/180149 A1 *  12/2015

OTHER PUBLICATIONS

Roelkens et al.; "Grating-Based Optical Fiber Interfaces for Silicon-on-Insulator Photonic Integrated Circuits", Oct. 21, 2010, 10 pages.
(Continued)

*Primary Examiner* — Michael Stahl
(74) *Attorney, Agent, or Firm* — Hewlett Packard Enterprise Patent Departmant

(57) ABSTRACT

Examples described herein relate to an optical device that entails phase shifting an optical signal. The optical device includes an optical waveguide having a first semiconductor material region and a second semiconductor material region formed adjacent to each other and defining a junction therebetween. Further, the optical device includes an insulating layer formed on top of the optical waveguide. Moreover, the optical device includes a III-V semiconductor layer formed on top of the insulating layer causing an optical mode of an optical signal passing through the optical waveguide to overlap with the first semiconductor material region, the second semiconductor material region, the insulating layer, and the III-V semiconductor layer thereby resulting in a phase shift in the optical signal passing through the optical waveguide.

17 Claims, 9 Drawing Sheets

(51) Int. Cl.
*G02F 1/015* (2006.01)
*G02B 6/34* (2006.01)

(56) References Cited

U.S. PATENT DOCUMENTS

| | | | |
|---|---|---|---|
| 6,748,125 | B2 | 6/2004 | Deliwala |
| 7,715,458 | B2 | 5/2010 | Kim et al. |
| 10,330,962 | B1* | 6/2019 | Calvo ..................... G02F 1/025 |
| 2007/0297709 | A1* | 12/2007 | Montgomery .......... G02F 1/025 385/2 |
| 2008/0112032 | A1* | 5/2008 | Vlasov .................... G02F 1/011 359/248 |
| 2009/0154868 | A1* | 6/2009 | Park ........................ G02F 1/025 385/8 |
| 2011/0176762 | A1* | 7/2011 | Fujikata ................. G02F 1/025 427/64 |
| 2014/0153859 | A1* | 6/2014 | Akiyama ................ G02F 1/025 385/2 |
| 2015/0301363 | A1* | 10/2015 | Chen ................... H01L 29/4966 438/69 |
| 2015/0381283 | A1* | 12/2015 | Sahni ...................... G02F 1/025 398/188 |
| 2016/0299402 | A1* | 10/2016 | Abraham .............. G02F 1/2257 |
| 2016/0380407 | A1* | 12/2016 | Sysak ................... H01S 5/1228 398/214 |
| 2022/0206323 | A1* | 6/2022 | Gevorgyan ............. G02F 1/025 |

OTHER PUBLICATIONS

Alaa Abdulwahid Sharhan, "Transfer Matrix Mathematical Method for Evaluation the DBR Mirror for Light Emitting Diode and Laser", Journal of Physics: Conference Series, 2019, 8 pages.

Azadeh et al., "Low Vp Silicon photonics modulators with highly linear epitaxially grown phase shifters", vol. 23, No. 18, 2015, 25 pages.

Barnett et al., "Cisco Visual Networking Index (VNI) Complete Forecast Update, 2017-2022", Cisco, 2018, 125 pages.

Debnath et al., "All-silicon carrier accumulation modulator based on a lateral metal-oxide-semiconductor capacitor", 2018, 7 pages.

Descos et al., "Heterogeneous O-Band InAs/GaAs Quantum-Dot Optical Amplifier on Silicon", Asia Communications and Photonics Conference, 2021, 3 pages.

Han et al., "Efficient low-loss InGaAsP/Si hybrid MOS optical modulator", Nature Photonics, vol. 11, Aug. 2017, pp. 486-490.

Hsu et al., "MOS Capacitor-Driven Silicon Modulators: A Mini Review and Comparative Analysis of Modulation Efficiency and Optical Loss", IEEE, 2021, 13 pages.

Kurczveil et al., "Hybrid Silicon Quantum Dot Comb Laser with Record Wide Comb Width", 2020, 2 pages.

Li et al., "Si racetrack optical modulator based on the III-V/Si hybrid MOS capacitor", vol. 29, No. 5, Mar. 1, 2021, 10 pages.

Liu et al., "A high-speed silicon optical modulator based on a metal-oxidesemiconductor capacitor", Nature Publishing Group, 2004, pp. 615-618.

Liu et al., "High-speed optical modulation based on carrier depletion in a silicon waveguide", / vol. 15, No. 2, 2007, 9 pages.

Lu et al., "Flexible and Scalable Optical Interconnects for Data Centers: Trends and Challenges", IEEE Communications Magazine, Oct. 2019, pp. 27-33.

Richard A. Soref, "Silicon-Based Optoelectronics", IEEE, Proceedings of the IEEE, vol. 81, No. 12, Dec. 1993, pp. 1687-1706.

Srinivasan et al., "8x25 GB/s DWDM Transmitter Demonstration on a Heterogeneous Silicon Photonic Platform", Advanced Photonics Congress, 2021, 2 pages.

Srinivasan et al., "High Temperature Performance of Heterogeneous MOSCAP Microring Modulators", 2021, 3 pages.

Xu et al., "12.5 Gbit/s carrier-injection-based silicon microring silicon modulators", Jan. 22, 2007 / vol. 15, No. 2, 7 pages.

* cited by examiner

OPTICAL DEVICE INCLUDING A GRATED OPTICAL WAVEGUIDE TO IMPROVE MODULATION EFFICIENCY

BACKGROUND

In a silicon photonics platform, optical phase shifters are useful parts to form optical modulators. The optical phase shifters are used to control the phase of light by inducing a change in an effective refractive index corresponding to an applied modulating signal (e.g., voltage). Due to the lack of other significant electro-optic effects on silicon, the optical phase shifters used in silicon photonic integrated circuits are generally designed to induce a phase shift in the optical signal using a plasma dispersion effect.

Common types of optical phase shifters used in silicon photonic integrated circuits are a PN junction, a PIN junction, or a metal-oxide-semiconductor (MOS) capacitor (MOSCAP). In these phase shifters, the free carrier densities in the respective regions may be controlled by the application of electrical voltage to change the effective refractive index, causing a phase shift in the optical signal passing through the given region. For example, to achieve phase shift in the optical signal, the PN junction and the PIN junction may be operated in a carrier-injection mode by applying a forward bias voltage, or in a carrier-depletion mode by applying a reverse bias voltage. Further, the MOSCAP used as the phase shifter typically includes an insulating layer sandwiched between two conductive electrically conductive layers one of which may be a doped silicon waveguide. In a silicon photonic integrated circuit, the MOSCAP is typically operated in a carrier-accumulation mode to cause a phase shift in the optical signal. These phase shifters in the silicon photonic integrated circuits generally suffer from low modulation efficiency due to a weak plasma dispersion effect in silicon material, high-energy consumption, slow-speed operation, and fabricating complexities.

BRIEF DESCRIPTION OF THE DRAWINGS

Various examples will be described below with references to the following figures.

Figure 1:
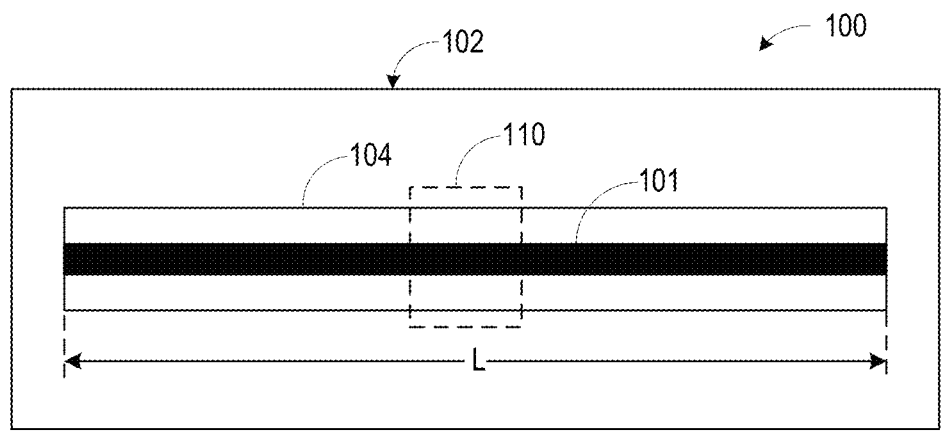
FIG. 1 depicts an example optical device.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, the same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Optical systems such as optical interconnects used in modern-day electronic systems (e.g., data centers and computer systems) include optical devices that can generate, process, and/or carry optical signals from one point to another point. Further, in the recent state of technology, the increased growth of data communication traffic has led to an increased usage of optical communications. Accordingly, modern data centers and computing systems that employ optical interconnects offer high-throughput and low-latency to enable optical communication among numerous servers, memory, and computation resources. As the network size and complexity increase, the optical transmitters in optical interconnects may demand a significant amount of power consumption. Therefore, it is useful to have energy-efficient internal components of the optical interconnects.

Typically, the optical interconnects include an optical transmitter including light sources (e.g., lasers), optical modulators, and optical amplifiers. An optical signal generated by a light source in the optical interconnect may be modulated by an optical modulator. Further, the modulated optical signal may be amplified by an optical amplifier. The amplified optical signal may be transmitted to an optoelectronic receiver through an optical fiber. The optoelectronic receiver may demodulate the received signal to extract the information signal carried by the optical signal.

The optical modulator used in the optical transmitter uses a phase shifter to modulate an optical signal. The key performance parameter for the optical modulator is its modulation efficiency, which may be defined as the product of voltage $V_\pi$ applied to the phase shifter to achieve a phase shift of magnitude $\pi$ shift and a length L of the modulator. A smaller $V_\pi L$ represents low power consumption and high modulation efficiency. Therefore it is useful to achieve lower values of $V_\pi L$.

In conventional phase shifters implemented via silicon photonics, a plasma dispersion effect is commonly used to adjust the optical signal phase due to the lack of other significant electro-optic effects on silicon. Common types of optical phase shifters used in silicon photonic integrated circuits are a PN junction, a PIN junction, and a MOSCAP. In these phase shifters, the free carrier densities may be controlled by the application of electrical voltage to the respective phase shifters causing a phase shift in the optical signal. For example, to achieve phase shift in the optical signal, the PN junction, and the PIN junction may be operated in a carrier-injection mode by applying a forward bias voltage, and in a carrier-depletion mode by applying a reverse bias voltage. The operation of the PN junction and the PIN junction in the carrier-injection mode results in a slow-speed operation of an optical device employing the same. On the other hand, the operation of the PN junction and the PIN junction in the carrier-depletion mode can result in high-speed operation but suffers from a weak plasma dispersion effect in silicon. Due to the weak plasma dispersion effect in silicon, a variation caused in the refractive index is small causing low modulation efficiency. This eventually causes more power consumption for effecting a given phase shift (e.g., a phase shift of magnitude Tr) resulting in less energy-efficient operation.

The MOSCAP used as a phase shifter generally includes two electrically conductive layers (e.g., doped semiconductor layers) and a thin insulating layer sandwiched between electrically conductive layers. In silicon photonic integrated circuits, one or both of the two electrically conductive layers may be made of silicon, in particular, one electrically conductive layer is a silicon waveguide. When an electric field is applied across these semiconductor layers, free carriers accumulate on both sides of the insulating layer. The change in the free carrier densities in a given region alters the refractive index of the given region. A change in the refractive index causes a phase shift in the optical signal passing through the given region. As it is understood, the plasma dispersion effect in silicon is relatively weak resulting in reduced variations in the refractive index of the silicon waveguide, leading to inefficient optical phase shifting. Accordingly, the use of the MOSCAP in such a conventional manner may also result in a less efficient optical phase shifting.

Some known implementations of the MOSCAP-based modulator include an insulating layer sandwiched between a silicon layer (e.g., silicon waveguide) and a polycrystalline silicon (polySi) layer. However, the polySi layer has relatively high optical loss and needs additional material costs and process complexity during fabrication. Certain other known implementations of the MOSCAP-based modulator are III-V/Si hybrid MOSCAP Mach-Zehnder modulator and MOSCAP microring modulator (MRM). These devices include a thin III-V semiconductor material (e.g., n-type InGaAsP) membrane bonded on top of a p-type silicon waveguide. The III-V/Si hybrid MOSCAP generally has improved modulation efficiency compared to the polySi-based MOSCAP. In particular, the improved modulation efficiency is achieved due to the high refractive index of the III-V semiconductor material (e.g., InGaAsP) compared to silicon used in the MOSCAP. Also, these MOSCAP modulators are energy efficient as the MOSCAP generally has extremely low (e.g., near-zero) static power consumption. Therefore, in recent years, MOSCAP-based optical modulator has gained growing usage in active photonic devices due to their low power consumption and scalability in fabrication. However, the corresponding lasers and optical amplifiers are not found on the same silicon photonics platform. In particular, the lasers, the optical modulators, and the optical amplifiers are generally found as formed on separate semiconductor wafers, leading to an overall larger footprint of an optical transmitter.

With the advancements in technology, the next generation of optical systems employing fully-integrated dense wavelength division multiplexing (DWDM) transmitters on silicon may demand power consumption even lower than about 1.5 picojoules (pJ)/bit. Although the conventional MOSCAP-based modulators described hereinabove consume low power for operation, with such increased demands for more and more energy-efficient operations, the conventional MOSCAP-based modulators may also encounter challenges in satisfactory functioning with such low energy consumption requirements. Therefore, it is beneficial to further enhance the modulation efficiency of the MOSCAP-based optical modulators and make them more energy-efficient.

In accordance with examples consistent with this disclosure, proposed is an optical device that may be used as an optical modulator. The proposed optical device may achieve enhanced modulation efficiency and is also more energy-efficient compared to conventional MOSCAP-based modulators. The proposed optical device, in some examples, may include an optical waveguide comprising a grating formed along its length, and an insulating layer formed over the optical waveguide. For example, the optical waveguide may have a first side, on which the insulating layer is formed. Further, the optical device may include an electrically conductive layer formed over the insulating layer. The electrically conductive layer may be formed on a second side of the insulating layer, where the second side of the insulating layer is opposite the first side of the insulating layer. In particular, the optical waveguide, the insulating layer, and the electrically conductive layer form a waveguide integrated capacitor. In particular, the waveguide integrated capacitor is formed via the optical waveguide, an insulating layer, and an electrically conductive layer, such that the insulating layer is sandwiched between the optical waveguide and an electrically conductive layer. In particular, in some examples, the electrically conductive layer may be chosen to have a higher refractive index as compared to the optical waveguide. In some examples, the electrically conductive layer may be a doped III-V semiconductor material with a higher refractive index compared to the optical waveguide.

The enhanced modulation efficiency and the energy-efficient operation may be achieved at least in part due to a specially structured optical waveguide and the use of a waveguide integrated capacitor structure to control a phase shift. In particular, the optical waveguide includes grating with a periodic corrugation (e.g., parallel ridges and grooves). Such grating in the optical waveguide causes an optical mode of an optical signal passing through the optical waveguide to overlap substantially evenly between the optical waveguide and the electrically conductive layer thereby resulting in an enhanced modulation efficiency via the waveguide integrated capacitor. In particular, due to the grating formed in the optical waveguide, the optical mode aligns substantially with the middle of the waveguide integrated capacitor. This results in a substantially even distribution of the optical mode in both the electrically conductive layer and the optical waveguide.

Such distribution of the optical mode enhances overlap between the optical mode and free charge carrier-rich regions of the electrically conductive layer and the optical waveguide. The free charge carrier-rich regions are volumes of the electrically conductive layer and the optical waveguide where free charge carriers accumulate when a potential difference (e.g., control voltage) is applied across the waveguide integrated capacitor. Due to the increased overlap of the optical mode and the free charge carrier-rich regions and higher refractive index of the electrically conductive material (e.g., doped III-V semiconductor material), a change in the material properties (e.g., charge carrier concentrations) in free charge carrier-rich regions is much more effective when an optical mode of the optical signal also appears in the same region thereby causing the phase shift in the optical signal. This results in an improvement in the modulation efficiency of the proposed optical device. In particular, in an experimental setup (as will be described in greater detail in the detailed description of the drawings)

with the proposed optical device, the modulation efficiency is observed to have increased by about more than 200%.

Additionally, the use of the waveguide integrated capacitive structure enables low power operation of the optical device as the waveguide integrated capacitive structure consumes extremely low energy (e.g., near-zero static power consumption). Yet another advantage of the proposed optical device is enhanced wavelength tuning efficiency. In fact, a control voltage applied to the waveguide integrated capacitor may itself be sufficient to align a resonant wavelength (in the case of the optical device is a microring resonator) with the laser with no or negligible power consumption, and without requiring heating elements. This simplifies the design of the proposed optical device and results in a compact structure. Further, the enhanced wavelength tuning efficiency, the enhanced modulation efficiency, and energy-efficient operation of the proposed optical device also make the proposed optical device suitable for use in a tunable directional coupler for applications in photonic routing and neuromorphic networks. Furthermore, the proposed optical device with a Bragg-grated optical waveguide is suitable for current III-V/Si hybrid photonics platforms and no additional III-V materials and fabrication steps may be required resulting in decreased manufacturing costs and process complexity. With the use of a proposed optical device, an entire optical transmitter (i.e., a transmitter including light sources, optical modulators, and optical amplifiers) may be integrated closely on a single platform to minimize the transition loss.

Referring now to the drawings, in FIG. 1, a top view 100 of an example optical device 102 is presented. The optical device 102 may be representative of an optical device that entails phase shifting an optical signal. In the example implementation of FIG. 1, the optical device 102 may be an optical modulator such as a linear modulator. In another example, the optical device 102 may be an MZI or a ring modulator (see FIG. 2). In some examples, the optical device 102 may form a part of a photonic integrated circuit (see FIG. 10). In one example implementation, the photonic integrated circuit may be implemented in an optical transceiver. The optical transceiver, in some examples, is disposed in an electronic system such as but not limited to, computers (stationary or portable), servers, storage systems, wireless access points, network switches, routers, docking stations, printers, or scanners.

The optical device 102 may include an optical waveguide 104 and an integrated phase shifter 101. In the example implementation of FIG. 1, for illustration purposes, the optical waveguide 104 is formed having a linear shape (e.g., a straight rectangular shape). In some other examples, the optical device 102 may also include differently shaped (e.g., circular loop, oval loop, rounded rectangle loop, rounded square loop, rounded triangle loop, elongated oval, wavy, curved, etc.) optical waveguide, without limiting the scope of the examples presented herein. Further, the optical waveguide 104 may include a grating (see FIG. 3) formed along at least a portion of the length (L) of the optical waveguide 104. In some examples, the grating may have a Bragg grating structure which includes reflecting structures with a periodic refractive index modulation. Details of the grating formed in the optical waveguide 104 are described in conjunction with FIGS. 3-5.

Figure 3:
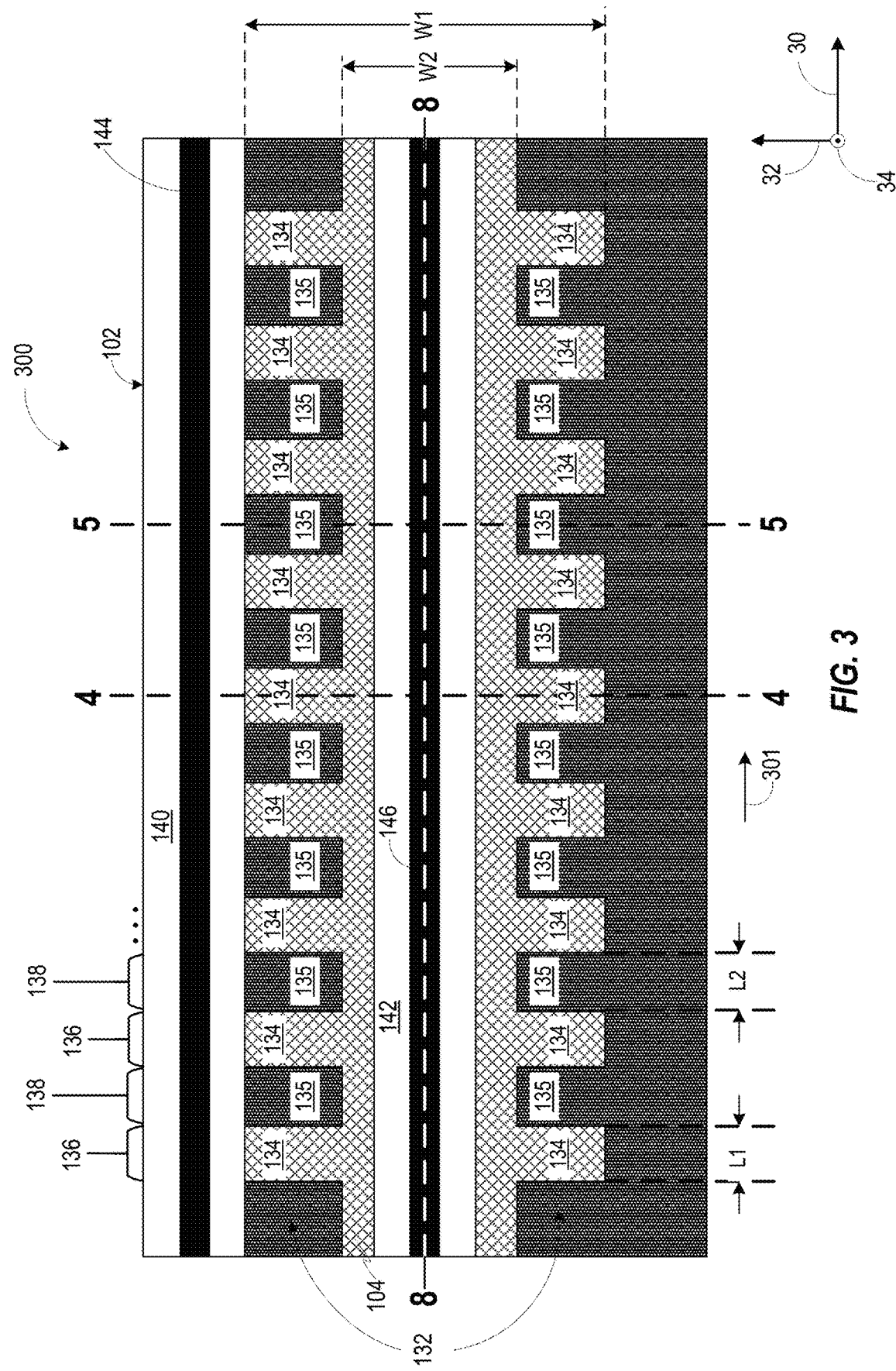
FIG. 3 depicts a top view of a portion of an example optical device.
Figure 4:
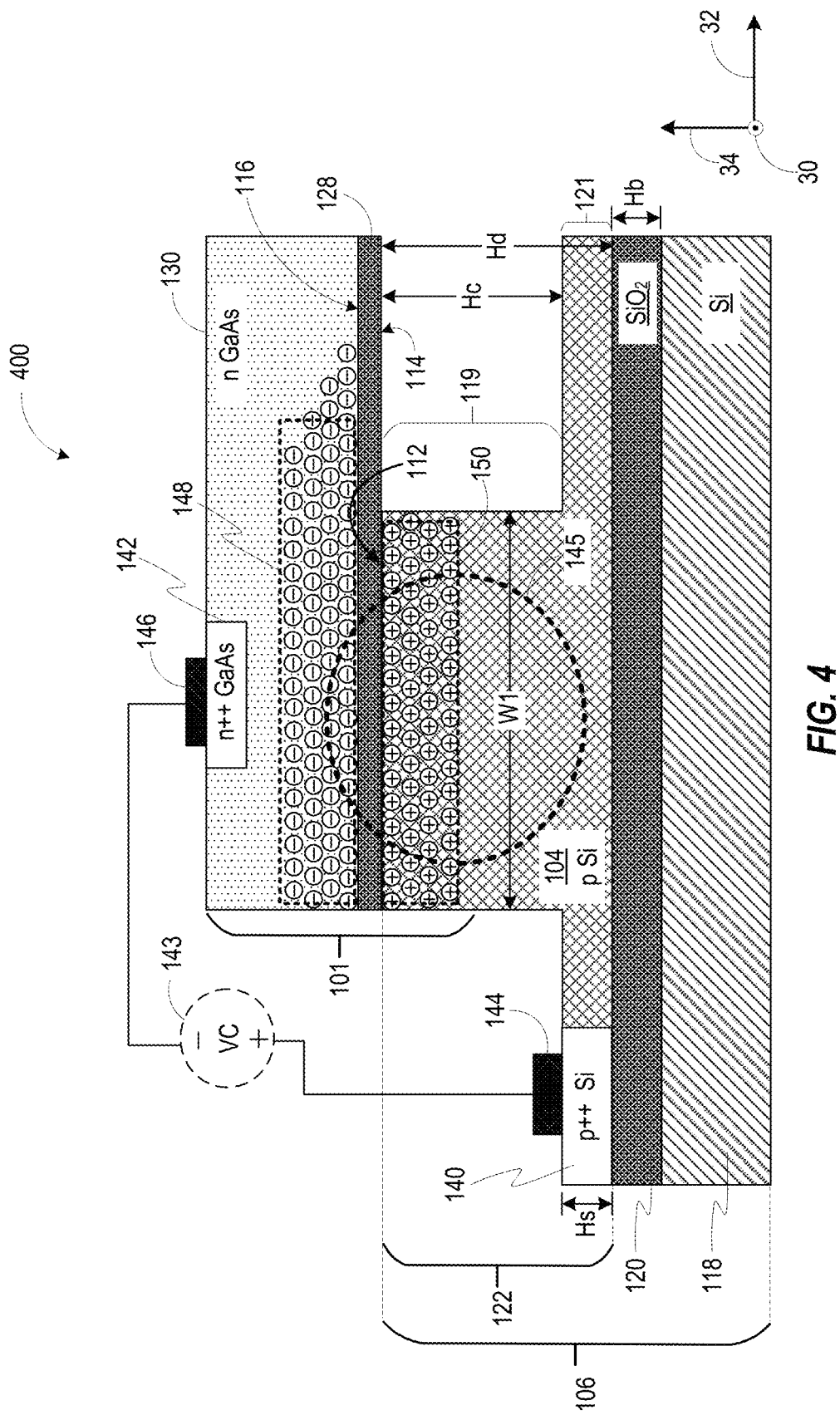
FIG. 4 depicts a cross-sectional view of an example optical device.
Figure 5:
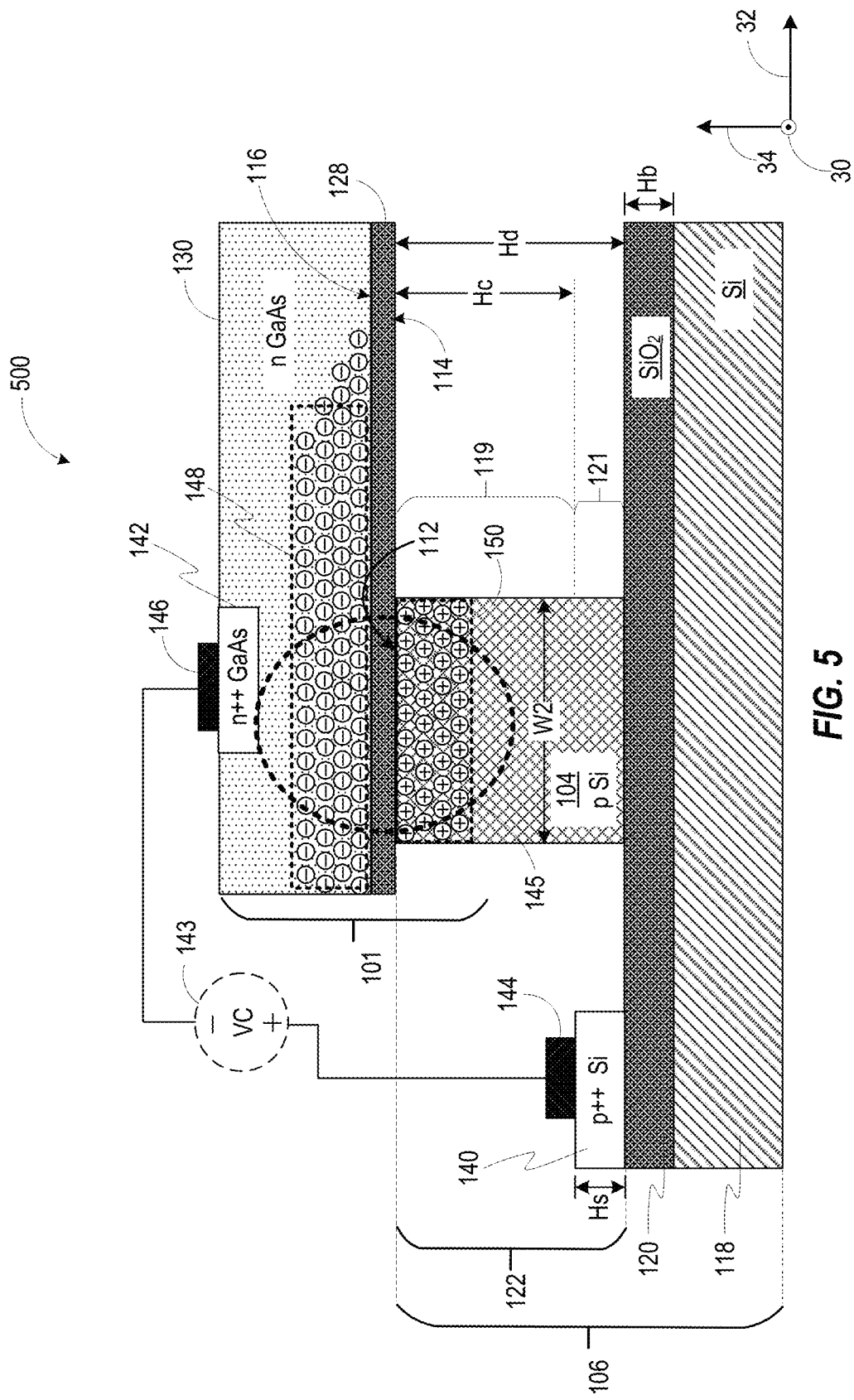
FIG. 5 depicts another cross-sectional view of an example optical device.

The integrated phase shifter 101 may be formed by the optical waveguide 104 and one or more additional material layers (described in conjunction with cross-sectional views of FIGS. 4 and 5). In one example, the optical waveguide 104 and the one or more additional material layers may be fabricated to form the integrated phase shifter 101 in the form of a waveguide integrated capacitor (marked in FIGS. 4 and 5). During the operation of the optical device 102, an optical signal may be passed through the optical waveguide 104 and a control voltage may be applied to the integrated phase shifter 101. In particular, the application of the control voltage to the integrated phase shifter 101 causes a change in the refractive index of the integrated phase shifter 101 (to be described in detail later in FIGS. 4 and 5). Due to the change in the refractive index, the phase of the optical signal passing through the optical device 102 changes, resulting in the modulation of the optical signal. Both the grating formed in the optical waveguide 104 and the control of the phase shift via the integrated phase shifter 101 causes the optical device 102 to achieve enhanced modulation efficiency and consume lesser power compared to conventional MOSCAP-based modulators. Additional structural details of the optical device 102 are described in conjunction with cross-sectional views of FIGS. 3-5.

Figure 2:
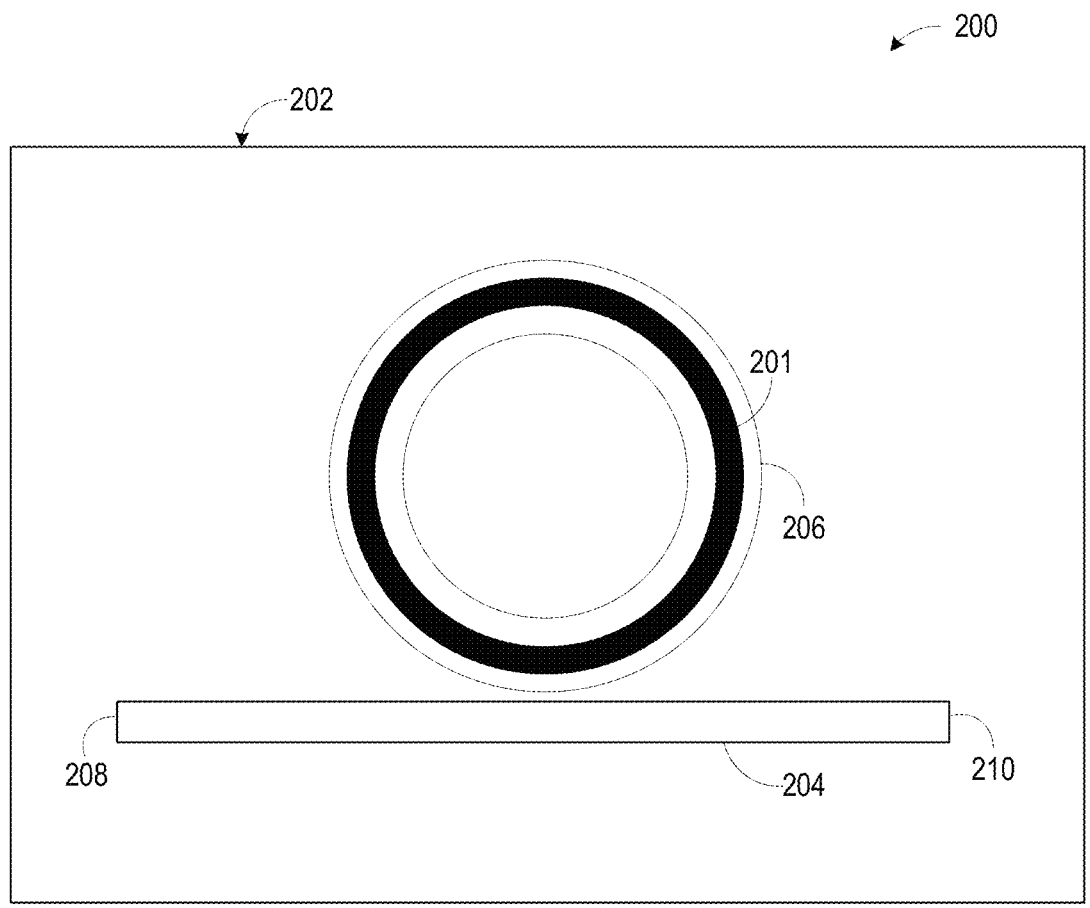
FIG. 2 depicts another example optical device.

FIG. 2 depicts a top view 200 of another example optical device 202. The optical device 202 of FIG. 2 may be an example representative of the optical device 102 of FIG. 1. For example, the optical device 202 may be a ring modulator, which may, for example, be used in photonic integrated circuits implemented in optical transceivers.

In the example implementation shown in FIG. 2, the optical device 202 may include photonic components such as a coupling waveguide 204 and an annular waveguide 206. For illustration purposes, in FIG. 2, the annular waveguide 206 is shown to have a ring shape. However, in some other examples, the annular waveguide 206 may also be formed to have a loop of any shape (e.g., circular loop, oval loop, rounded rectangle loop, rounded square loop, rounded triangle loop, etc.), within the purview of the present disclosure. In some examples, the annular waveguide having a loop shape that is elongated to have a straight section along one direction (e.g., racetrack-shaped or elongated oval-shaped) is also envisioned within the purview of the present disclosure. Further, in some examples, the annular waveguide 206 may include a grating formed along the annulus of the annular waveguide 206. In some examples, the grating may have a Bragg grating structure. The grating formed in the optical waveguide 206 may have similar features as described in conjunction with FIGS. 3-5.

The coupling waveguide 204 may be formed adjacent to the annular waveguide 206 so that optical signal (e.g., light) passing through the coupling waveguide 204 is evanescently coupled to the annular waveguide 206. The coupling waveguide 204 may include an input port 208 and an output port 210. An optical signal may be supplied to coupling waveguide 204 via the input port 208. From the optical signal supplied at the input port 208, a light wave having a wavelength equal to the resonant wavelength of the annular waveguide 206 may be coupled into (e.g., trapped inside) the annular waveguide 206. The resonant wavelength of the annular waveguide 206 may be a function of its physical parameters, for example, dimensions and/or material properties.

In some examples, the annular waveguide 206 may include an integrated phase shifter 201. The integrated phase shifter 201 may be an example representative of the integrated phase shifter 101 of FIG. 1 and may be formed along at least a portion of the annular waveguide 206. Accordingly, during the operation of the optical device 202, a control voltage may be applied to the integrated phase shifter 201. In particular, the application of the control voltage to the integrated phase shifter 201 causes a change in the refractive index of the integrated phase shifter 201 (to be described in detail later in FIGS. 3 and 4). Due to the change in the refractive index, the phase of the optical signal passing through the optical device 202 changes, resulting in the modulation of the optical signal. Both the grating formed in the annular waveguide 206 and the control of the phase shift via the integrated phase shifter 201 cause the optical device 102 to achieve enhanced modulation efficiency. Further, due to the increased modulation efficiency, the voltage required to cause a unit phase shift (e.g., a phase shift of $\pi$) reduces, resulting in reduced power consumption by the optical device. Additional structural details of the optical device 202 are described in conjunction with cross-sectional views of FIGS. 3-5.

Referring now to FIGS. 3-5, in FIG. 3 a top view 300 of an example optical device is presented. Further, in FIG. 4, a cross-sectional view 400 of an example optical device is depicted, and another cross-sectional view 500 of the example optical device is depicted in FIG. 5. The views 300, 400, and 500 are described with reference to the optical device 102 of FIG. 1 and use common reference numerals for like parts. In particular, the view 300 of FIG. 3 depicts a top view of a region 110 of the optical device. Further, the view 400 of FIG. 4 represents a cross-section of the optical device 102 taken at a location 4-4 depicted in FIG. 3 when seen in a direction 301. Moreover, the cross-sectional view 500 of FIG. 4 represents a cross-section of the optical device 102 taken at a location 5-5 depicted in FIG. 3 when seen in the direction 301. Further, in FIGS. 3-5, arrows 30, 32, and 34 show an axial (or circumferential) direction, a lateral direction, and a vertical direction (hereinafter referred to as "axial direction 30," "lateral direction 32," and "vertical direction 34"). The axial direction 30, the lateral direction 32, and the vertical direction 34 may be perpendicular to each other. In the description hereinafter, FIGS. 3-5 are generally referenced concurrently in the description hereinafter. Also, for clarity of representation, certain regions/layers of the optical device 102 shown in the cross-sectional views 400 and 500 are not depicted in the top view 300, or vice-versa. In some examples, the optical device 202 may also have similar structural features as described in FIGS. 3-5, without limiting the scope of the present disclosure.

As depicted in FIGS. 3-5, the optical device 102 includes an optical waveguide 104 and the integrated phase shifter 101 (hereinafter also alternatively referred to as a waveguide integrated capacitor 101) may be formed in a common semiconductor substrate 106. In some examples, the semiconductor substrate 106 may be a silicon on insulator (SOI) substrate that may include a base substrate layer 118, a base oxide layer 120, and a device layer 122. For the clarity of representation of the features of the optical waveguide 104, the integrated phase shifter 101, the base substrate layer 118, the base oxide layer 120, and the device layer 122 are marked in the views depicted in FIGS. 4 and 5. The base substrate layer 118 may be made of semiconductor material, for example, silicon (Si). Other examples of materials that may be used to form the base substrate layer 118 may include III-V semiconductors, such as indium phosphide (InP), germanium (Ge), gallium arsenide (GaAs), aluminum gallium arsenide (AlGaAs), indium gallium arsenide (InGaAs), indium arsenide (InAs), or combinations thereof.

The base oxide layer 120 may be formed by oxidizing the base substrate layer 118 or by way of depositing a dielectric material over the substrate layer 118. In the implementation of the optical resonating device 102, for the base substrate layer 118 made of silicon, the base oxide layer 120 may comprise silicon dioxide ($SiO_2$), which may be formed in the presence of oxygen at a temperature in the range from 900° C. to 1380° C. In some examples, the base oxide layer 120 may be a buried oxide (BOX) layer (e.g., the $SiO_2$ may be buried in the base substrate layer 118). Example materials of the base oxide layer 120 may include dielectric materials such as, but not limited to, $SiO_2$, Silicon Nitride ($Si_3N_4$), Aluminum oxide ($Al_2O_3$), Hafnium Dioxide ($HfO_2$), diamond, silicon carbide (SiC), or combinations thereof. In some examples, a layer of $SiO_2$ may be buried in the base substrate layer 118 at a depth ranging from less than 100 nm to several micrometers from the wafer surface depending on the application. In one example, the base oxide layer 120 (e.g., BOX) of about 2 μm thickness/height (Hb) may be formed on the base substrate layer 118 (e.g., Si).

The device layer 122 may be formed on top of the base oxide layer 120. In the example implementation of FIG. 1, the device layer 122 is composed of silicon. In one example, the device layer 122 may have a thickness/height (Hd) of about 400 nm on the base oxide layer 120 (e.g., BOX). The device layer 122 may be suitably shaped (e.g., via techniques such as photolithography and etching) to form one or more regions, such as, the optical waveguide 104 (or an annular waveguide in the case of the optical device 202 of FIG. 2) and contact regions (described later), for example. Further, in some examples, the device layer 122 may be doped with impurities in a region that is defined as the optical waveguide 104 to introduce free charge carriers in the optical waveguide 104. In some examples, the optical waveguide 104 is made of semiconductor material of the device layer (e.g., InP, Ge, GaAs, AlGaAs, InGaAs, InAs, or combinations thereof).

In some examples, the waveguide integrated capacitor 101 may be formed by the optical waveguide 104, an insulating layer 128, and an electrically conductive layer 130. For the clarity of representation of the features of the optical waveguide 104, the insulating layer 128 and the electrically conductive layer 130 are not shown in the top view 300 of FIG. 3 but, are shown in the cross-sections views 400 and 500 depicted respectively in FIGS. 4 and 5. As depicted in FIGS. 4 and 5, the insulating layer 128 is formed on a first side 112 of the optical waveguide 104. Further, the electrically conductive layer 130 is formed over the insulating layer 128. In particular, the electrically conductive layer 130 may be formed on a second side 116 of the insulating layer 128. The second side 116 of the insulating layer is opposite a first side 114 of the insulating layer 128. In particular, the waveguide integrated capacitor 101 is formed such that the insulating layer 128 is sandwiched between the optical waveguide 104 and the electrically conductive layer 130.

In some examples described herein, the electrically conductive layer 130 is described as formed using a doped III-V semiconductor material. The use of other types of electrically conductive materials is also envisioned within the purview of the present disclosure. In some examples, to form the electrically conductive layer 130, a layer of a III-V semiconductor material may be heterogeneously formed on the second side 116 (e.g., on top of) the insulating layer 128. The electrically conductive layer 130 may be formed using epitaxial growth, deposition techniques (e.g., CVD), wafer bonding, transfer printing, or combinations thereof. In particular, techniques such as epitaxial growth and/or wafer bonding of the electrically conductive layer 130 facilitate planar heterogeneous integration of other device structures such as lasers, modulators, and photon detectors all on a common substrate (e.g., the substrate 106). In some examples, the electrically conductive layer 130 may be chosen to have a lower refractive index as compared to the optical waveguide. In some examples, the electrically conductive layer 130 may also be chosen to have a higher refractive index as compared to the optical waveguide.

In some examples, the optical waveguide 104 may include a first-type doping and the III-V semiconductor material in the electrically conductive layer 130 may include different second-type doping. For illustration purposes, the first-type doping is described as p-type and the second-type doping is described as n-type. In other examples, the first-type doping may be n-type and the second-type doping may be p-type. In the description hereinafter and in the drawings, the optical waveguide 104 and the electrically conductive layer 130 are shown to include p-type (i.e., the first-type doping) doping and n-type doping (i.e., the second-type doping), respectively.

The n-type doping may be achieved by doping a respective semiconductor material with impurities having donor ions including, but not limited to, phosphorus (P), arsenic (As), antimony (Sb), or bismuth (Bi). Accordingly, the semiconductor material with n-type doping may have electrons in excess of holes. In the semiconductor material with n-type doping, the electrons that are in excess of the holes are also referred to as free electrons which act as free charge carriers. The p-type doping may be achieved by doping a respective semiconductor material with impurities having acceptor ions including, but not limited to, boron (B), gallium (Ga), indium (In), or aluminum (Al). Accordingly, the semiconductor material with p-type doping may have holes in excess of electrons. In particular, in one example, the optical waveguide 104 may have the p-type doping concentration of about $2 \times 10^{18}$ cm$^{-3}$, and the electrically conductive layer 130 may have the n-type doping concentration of about $3 \times 10^{18}$ cm$^{-3}$. In the semiconductor material with p-type doping, the holes that are in excess of the electrons are also referred to as free holes which act as free charge carriers. The n-type doping or p-type doping may be achieved by using techniques such as impurity diffusion, ion implantation, in-situ doping, and the like. In the description hereinafter, the term "free charge carriers" or "free carriers" may represent the free electrons with reference to the semiconductor material when having n-type doping. Further, the term "free charge carriers" or "free carriers" may represent the free holes with reference to the semiconductor material when having p-type doping.

Further, in accordance with some examples, the optical waveguide 104 may be designed to have a grating 132. As depicted in FIG. 3, the grating 132 may include a plurality of parallel ridges 134 of the semiconductor material formed along the length of the optical waveguide 104. Due to the formation of the ridges 134 in the optical waveguide 104, the optical waveguide 104 includes alternately formed first optical waveguide sections 136 and second optical waveguide sections 138 (see FIG. 3). In particular, the cross-sectional view 400 represents a cross-section of the optical device 102 taken along a first optical waveguide section 136, and the cross-sectional view 500 represents a cross-section of the optical device 102 taken along a second optical waveguide section 138. In particular, the first optical waveguide sections 136 of the optical waveguide 104 define the ridges 134, and the second optical waveguide sections 138 define grooves 135.

The optical waveguide 104 has a first width W1 (see FIG. 4) along the first optical waveguide sections 136 and a second width W2 (see FIG. 5) along the second optical waveguide sections 138, where W2 is smaller than W1. In particular, to form the grooves 135 in the second optical waveguide sections 138, the material of the device layer 122 may be removed (e.g., by chemically or mechanically etching the material of the device layer 122 from the second optical waveguide sections 138) except in the width W2 (see FIG. 5). For example, as depicted in the cross-section view 500 of FIG. 5, the material of the device layer 122 does not exist on the base oxide layer 120 except in along the width W2. By removing the material of the device layer 122 in the second optical waveguide sections 138 as described, the ridges 134 are formed in the device layer 122 in the first optical waveguide sections 136.

Further, due to the absence of the material of the device layer 122 (except along the width W2), the optical waveguide 104, in the second optical waveguide sections 138, is narrower than in the first optical waveguide sections 136. In some examples, the width W1 may be set to 500 nm, the width W2 may be set to 300 nm, a height/thickness (Hc) of core region 119 of the optical waveguide 104 may be set to 225 nm, and a height (Hs) of a waveguide base 121 (also referred to as slab height Hs) may be set to 175 nm. Accordingly, in an example implementation, a total height (Hd=Hc+Hs) of the device layer 122 is 400 nm. Further, the height (Hb) of the base oxide layer 120 may be set to about 2 μm on the base substrate layer 118).

Also, for illustration purposes, in FIG. 3, the ridges 134 are shown as uniformly distributed along the length of the optical waveguide 104. In particular, to have the uniform distribution of the ridges 134 along the length of the optical waveguide 104, the spacing between adjacent ridges 134 is maintained uniform. In an example implementation of the optical device 102, a length L1 of the first optical waveguide sections 136 may be set to 273 nm, and a length L2 of the second optical waveguide sections 138 (e.g., a distance between two adjacent ridges 134) may be set to 273 nm. In some other examples, the optical waveguide 104 may be designed to have non-uniformly distributed ridges, without limiting the scope of the present disclosure.

Furthermore, in some examples, the optical device 102 may include contact regions 140 and 142 (hereinafter collectively referred to as contact regions 140-142). The contact region 140 is formed in the device layer 122 in electrical contact (e.g., in direct physical contact or via any intermediate electrically conductive material) with the optical waveguide 104 in the first optical waveguide sections 136 (see FIGS. 3 and 4). Accordingly, the contact region 140 may comprise the material of the device layer 122. The optical waveguide 104 may not be in direct contact with the contact region 140 in the second optical waveguide sections 138. Further, the contact region 142 is formed in the electrically conductive layer 130 and includes a material of the electrically conductive layer 130. In some examples, the contact regions 140 and 142 may respectively include the first-type doping and the second-type doping. In some examples, for good electrical conductivity, the contact regions 140 and 142 may have a higher concentration of respective doping in comparison to doping concentrations in the optical waveguide 104 and the electrically conductive layer 130. Accordingly, the contact regions 140, 142 may be considered highly doped regions and are marked with labels "p++" and "n++" as depicted in FIGS. 4 and 5.

Moreover, in some examples, the optical device 102 may include metal contacts 144 and 146 (hereinafter collectively referred to as metal contacts 144, 146). As depicted in FIGS. 3-5, the metal contacts 144, 146 are respectively formed in electrical contact (e.g., in direct physical contact or via any intermediate electrically conductive material) with the contact regions 140, 142. In some examples, the metal contacts 144, 146 may be formed on top of (i.e., vertically over) the contact regions 140, 142, respectively. Examples of materials used to form the metal contacts 144, 146 may include, but are not limited to, copper (Cu), gold (Au), Al, and/or platinum (Pt).

In accordance with examples consistent with this disclosure, the optical device 102 may be used as an optical modulator and can achieve enhanced modulation efficiency and is more energy-efficient compared to conventional MOSCAP-based modulators. In particular, during the operation of the optical device 102, an optical signal may be passed through the optical waveguide 104 and the integrated phase shifter/waveguide integrated capacitor 101 may be operated in a charge carrier accumulation mode. In particular, to operate the waveguide integrated capacitor 101 in the charge carrier accumulation mode, a forward bias control voltage (Vc) may be applied to the waveguide integrated capacitor 101 via an external power source 143 (see FIGS. 4 and 5) through the metal contacts 144, 146. In an example implementation, the control voltage (Vc) is applied such that a positive potential (e.g., higher potential) appears at the metal contact 144 and a negative potential (e.g., higher potential) appears at the metal contact 146. In particular, when the waveguide integrated capacitor 101 is operated under such control voltage (Vc), the free carriers accumulate on either side of the insulating layer 128 in the electrically conductive layer 130 and in the optical waveguide 104 due to a forward electric-field caused by the control voltage (Vc).

On application of the control voltage (Vc), the density of the electrons and holes may increase in regions 148 and 150 (marked with dashed lines), respectively, and are therefore referred to as charge carrier-rich regions 148, 150. In particular, the charge carrier-rich regions 148 and 150 represent volumes of the electrically conductive layer 130 and in the optical waveguide 104, respectively, in which free charge carriers have higher density compared to the rest of the volume of the electrically conductive layer 130 and in the optical waveguide 104 on the application of the control voltage (Vc). The densities of electrons and holes, respectively, in the charge carrier-rich regions 148, 150 increase with an increase in the control voltage (Vc) and decreases with a decrease in the control voltage (Vc). The increase in the charge carrier densities in the charge carrier-rich regions 148, 150 reduce the refractive index of the waveguide integrated capacitor 101. On the other hand, the decrease in the charge carrier densities in the charge carrier-rich regions 148, 150 increases the refractive index of the waveguide integrated capacitor 101. The phase of the optical signal thus varies with the variations in the refractive index. Accordingly, the control voltage (Vc) may be suitably controlled to induce a desired phase shift in the optical signal.

In some examples, the control voltage (Vc) may be modulated by a modulating signal (not shown). In particular, when the control voltage (Vc) is modulated, the refractive index and hence, the phase of the optical signal, within the waveguide integrated capacitor 101 may vary in accordance with such modulating signal. This results in a modulation of the optical signal passing through the optical device 102 based on the modulating signal.

Generally, the optical mode tends to be confined in the high refractive index medium. The optical mode is an electric field distribution of an optical signal passing through the optical waveguide. In the proposed example optical device 102, optical waveguide 104 (e.g., made of Silicon) has a slightly higher refractive index compared to the electrically conductive layer 130 (e.g., made of III-V semiconductor layer). Therefore, the heterogeneous integration of the electrically conductive layer 130 over the optical waveguide 104 causes an optical mode 145 (see FIG. 4) inside the optical waveguide to overlap with all of the electrically conductive layer 130, the insulating layer 128, and mostly in the optical waveguide 104, within which the charge carrier densities are varied with the application of the control voltage (Vc).

Advantageously, the use of the grating 132 in the optical waveguide 104 enhances the overlap of the optical mode 145 (see FIG. 5) and the charge carrier-rich regions 148, 150. In particular, the narrow second optical waveguide sections 138 cause the optical mode 145 to change its shape and shift more toward the electrically conductive layer 130. Accordingly, the overall profile of the optical mode 145 along the length of the optical device 102, aligns closely in the middle of the waveguide integrated capacitor 101. In particular, the formation of the grating 132 in the optical waveguide 104 causes the optical mode 145 to be distributed substantially equally on either side of the insulating layer 128 (see FIG. 5). Such an even distribution of the optical mode 145 can cause maximum possible overlap between the charge carrier-rich regions 148, 150 and the optical mode. Accordingly, the variation in the material properties (e.g., refractive index) of the charge carrier-rich regions 148, 150 can cause a maximum impact on the phase of the optical signal passing through the optical device. Accordingly, the modulation efficiency of the optical device 102 greatly improves. In particular, in an experimental setup with the proposed optical device 102, the modulation efficiency is observed to have increased by about more than 200%. Details in improvements in the modulation efficiency are described in conjunction with FIG. 9.

Additionally, the use of the waveguide integrated capacitor 101 enables low power operation of the optical device 102 as the waveguide integrated capacitor 101 consumes extremely low energy (e.g., near-zero static power consumption). Yet another advantage of the proposed optical device is enhanced wavelength tuning efficiency. In fact, a control voltage (Vc) applied to the bias waveguide integrated capacitor can itself be sufficient to align a resonant wavelength (in the case of the optical device is a microring resonator) with the laser with no or negligible power consumption, and without requiring heating elements. This simplifies the design of the proposed optical device 102 and results in a compact structure. Further, the enhanced wavelength tuning efficiency, the enhanced modulation efficiency, and energy-efficient operation of the proposed optical device 102 also make the proposed optical device 102 suitable for use in a tunable directional coupler for applications in photonic routing and neuromorphic networks. Furthermore, the proposed optical device 102 with Bragg-grated optical waveguide 104 is suitable for current III-V/Si hybrid photonics platforms and no additional III-V materials and fabrication steps may be required resulting in decreased manufacturing costs and process complexity. With the use of a proposed optical device 102, an entire optical transmitter (i.e., a transmitter including light sources, optical modulators, and optical amplifiers) may be integrated closely on a single platform to minimize the transition loss.

Figure 6:
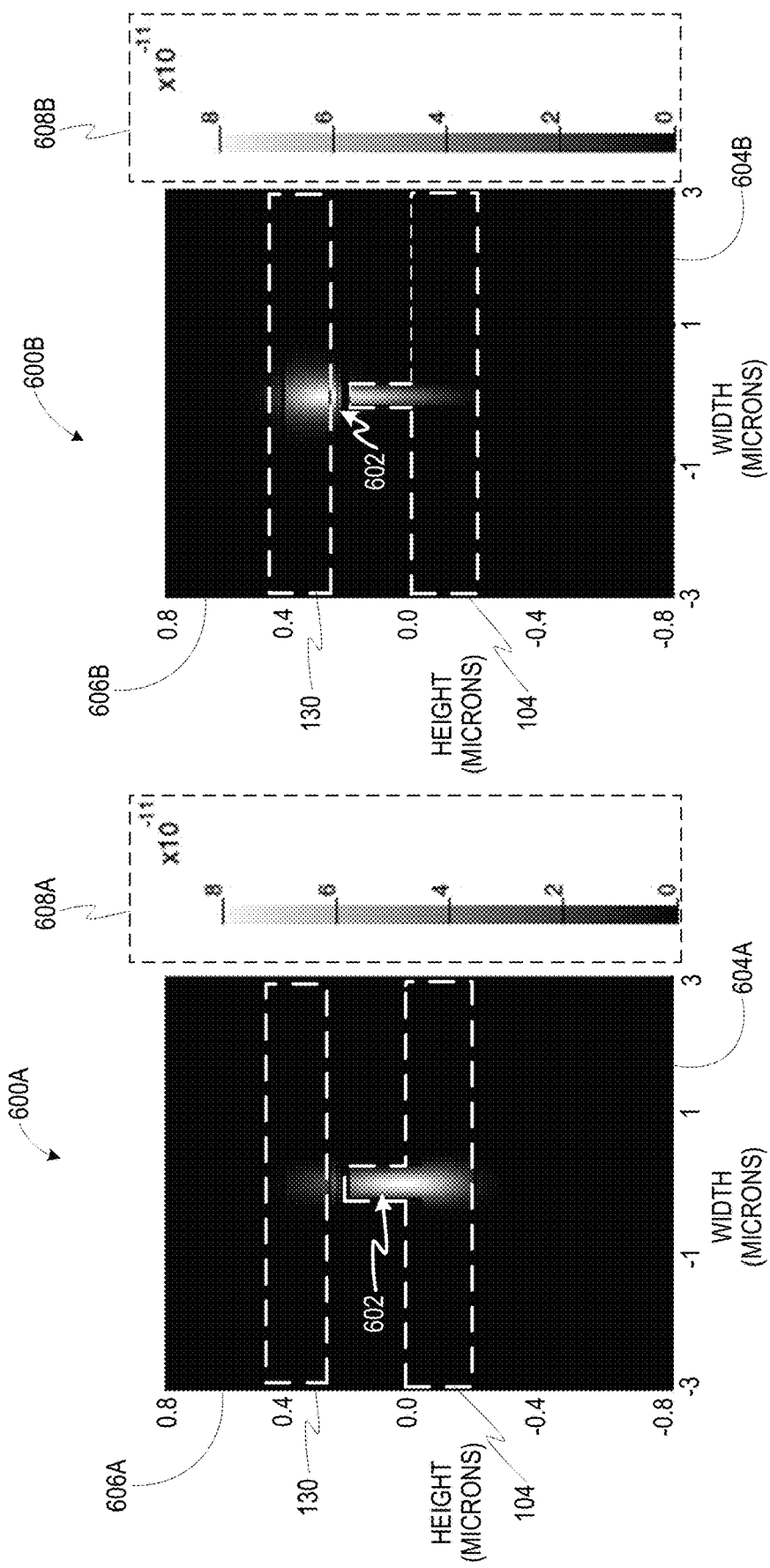
FIGS. 6A and 6B depict graphical representations of simulated optical mode profiles for an example optical device.

FIGS. 6A and 6B respectively represent graphical representations respectively depicting a simulated optical mode profile 600A along the first optical waveguide section 136 and a simulated optical mode profile 600B along the second optical waveguide section 138. In FIGS. 6A and 6B, X-axis 604A and 604B represent widths in microns, and Y-axis 606A and 606B represent height in microns. Further, scales 608A and 608B, represent optical power values in the multiples of $10^{-11}$. Furthermore, the electrically conductive region 130 and the optical waveguide 104 are marked with phantom lines. In particular, in one example, the optical mode profile 600A may be realized in the optical device 102 at the cross-section depicted in FIG. 4, and the optical mode profile 600B may be realized in the optical device 102 at the cross-section depicted in FIG. 5. For the simulation purposes, W1 (i.e., the width of the first optical waveguide sections 136) is chosen to be 500 nm, W2 (i.e., the width of the first optical waveguide sections 136) is chosen to be 300 nm, height/thickness (Hc) of a core region 119 of the optical waveguide 104 is chosen to be 225 nm, and a height (Hs) of waveguide base 121 (also referred to as slab height Hs) is set to 175 nm. Accordingly, the total height (Hd=Hc+Hs) of the device is 400 nm. Further, the height (Hb) of the base oxide layer 120 may be set to about 2 µm on the base substrate layer 118). Further, for the purpose of the simulations, the materials of the insulating layer 128, the optical waveguide 104, and the electrically conductive layer 130 are chosen to be $Al_2O_3$, silicon, and GaAs, respectively.

To evaluate the optical mode overlap, overlap percentages (also referred to as confinement factors) are evaluated in about ±20 nm region around the insulating layer 128 using an optical waveguide design tool (e.g., MODE® by Lumerical). The term overlap percentage for a given region may refer to a percentage of the optical mode that has overlapped with the given region. In the description hereinafter, an optical confinement factor/overlap percentage in the insulating layer 128 and the electrically conductive layer 130 are represented as $\Gamma_{Al2O3}$ and $\Gamma_{III-V}$, respectively.

In particular, in the device structure in the first optical waveguide section 136 (see FIGS. 3 and 4), as shown in FIG. 6A, a simulated optical mode 602 in the optical waveguide design tool demonstrates $\Gamma_{Al2O3}$=7.2% and $\Gamma_{III-V}$=14% with an overall effective refractive index of 3.16. The effective refractive index may be a value quantifying a phase delay per unit length in a given material relative to the phase delay in a vacuum. These values of $\Gamma_{Al2O3}$ and $\Gamma_{III-V}$ and the visual representation of the simulated optical mode 602 indicates that the majority portion of the optical mode is outside of the insulating layer 128 and the electrically conductive layer 130. In particular, while some portion of the optical mode may be dissipated outside of the optical waveguide 104, the majority portion (e.g., about 60%) is confined in the optical waveguide 104 in the first optical waveguide section 136 as silicon has a slightly higher refractive index compared the material of the electrically conductive layer 130 used herein, in some example. However, as Silicon has higher effective mass and lower mobility of the free charge carriers compared to the free charge carriers in the III-V semiconductor material, such distribution of the optical mode may not be very effective in causing a phase shift in the optical signal.

In the device structure in the second optical waveguide section 138 (see FIGS. 3 and 5), as shown in FIG. 6B, a simulated optical mode 602 demonstrates $\Gamma_{Al2O3}$=14.5% and $\Gamma_{III-V}$=65% with an overall effective refractive index of 2.88. The second optical waveguide sections 138 with narrower optical waveguide regions significantly enhances optical mode overlap with the insulating layer 128 and the electrically conductive layer 130. In particular, the increased overlap of the optical mode 602 with the insulating layer 128 may be indicative of the fact that the optical mode 602 also has more overlap with the charge carrier-rich regions 148 and 150 (shown in FIGS. 4-5) near the insulating layer 128. As previously noted, with the application of the control voltage, material properties (e.g., charge carrier concentration) vary in the charge carrier-rich regions 148 and 150 which in turn improves modulation efficiency.

The proposed example optical device 102 includes alternately placed first optical waveguide sections 136 and the second optical waveguide sections 138 resulting in an overall improved overlap between the optical mode and the charge carrier-rich regions 148 and 150 compared to conventional optical devices implementing MOSCAP phase shifters. In particular, FIG. 8 (described later) depicts a combined optical mode profile along a portion of the length of the optical device with about 20 pairs of alternately placed first optical waveguide sections 136 and the second optical waveguide sections 138.

Figure 7:
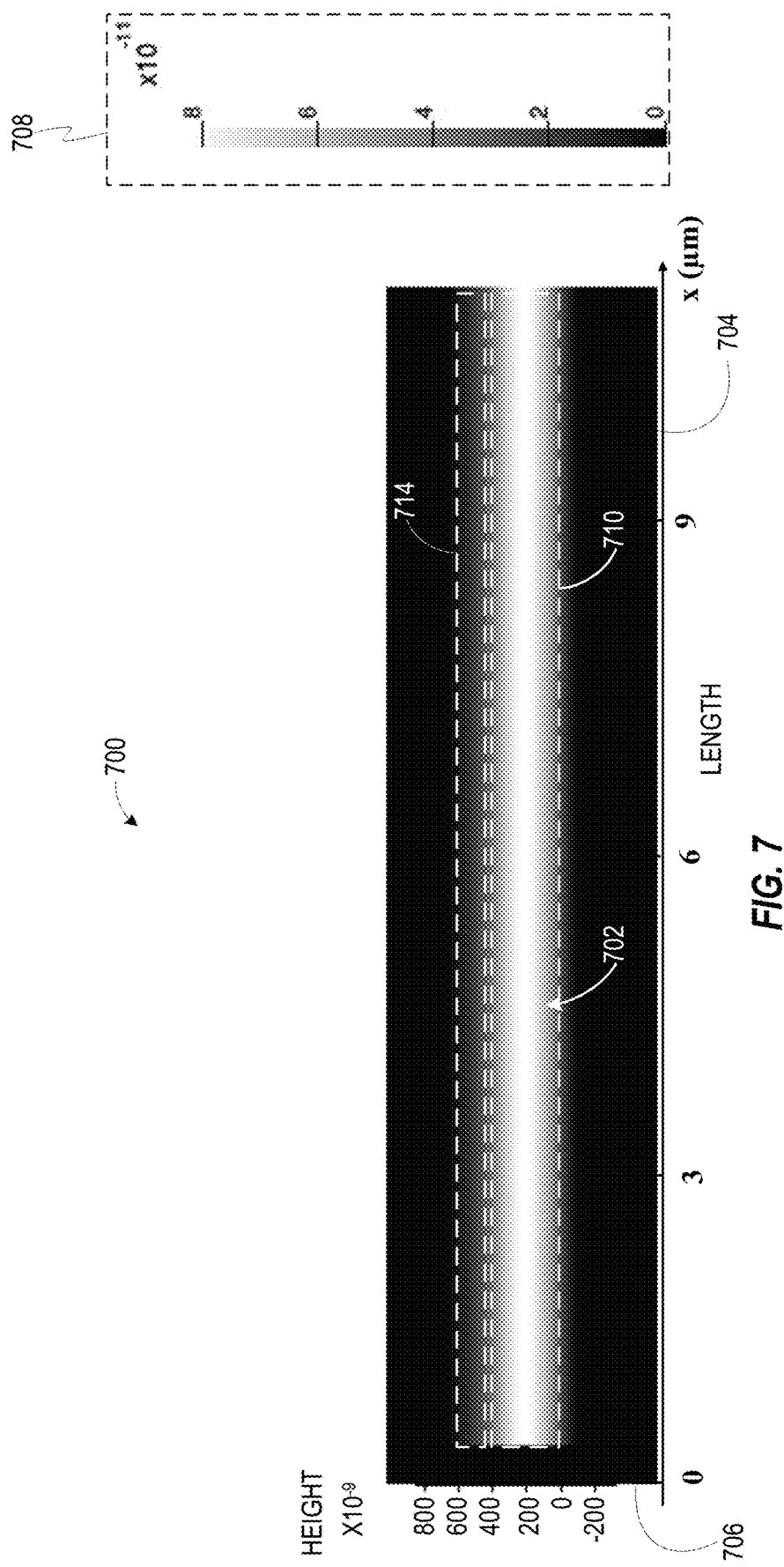
FIG. 7 depicts a graphical representation of a simulated optical mode profile along a portion of a length of an example optical device.
Figure 8:
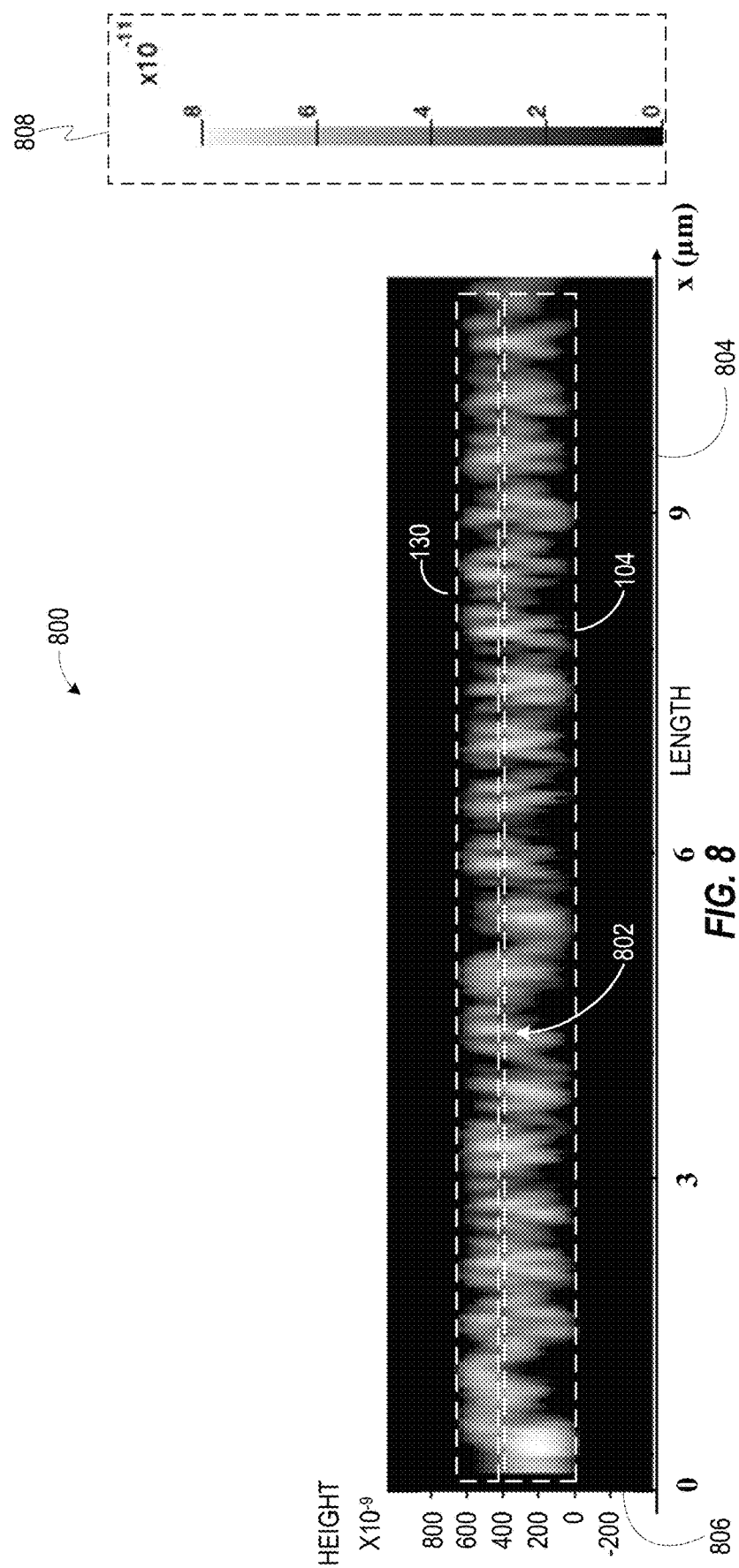
FIG. 8 depicts a graphical representation of a simulated optical mode profile along a portion of a length of an example optical device.

For illustration and comparison purposes, in the description hereinafter, FIGS. 7 and 8 are described concurrently. In FIG. 7, a graphical representation 700 depicting a simulated optical mode profile 702 along a portion of the length of a conventional optical device is presented. Further, in FIG. 8, a graphical representation 800 depicting a simulated optical mode profile 802 along a portion of the length of the example optical device 102 is presented. In particular, the simulated optical mode profile 802 may be realized along a cross-section 8-8 (see FIG. 3) in the optical waveguide 102. In FIG. 7, an X-axis 704 represents a length in microns, and a Y-axis 706 represents a height in microns. Further, a scale 708 represents optical power values in the multiples of $10^{-11}$.

For the purpose simulation of FIG. 7 performed using an optical waveguide design tool (e.g., FDTD by Lumerical), a conventional optical device is defined as having a MOSCAP phase shifter, with an optical waveguide 710 (marked with phantom lines between 0.0 µm to 0.4 µm) of 500 nm width and 400 nm height, and no grating. Further, the optical waveguide 710 of the conventional optical device is defined as made of silicon and has an insulating layer (between Si and III-V, for example between 0.4 µm to 0.415 µm) of $Al_2O_3$ which is sandwiched between the optical waveguide and a III-V semiconductor material layer 714 (marked with phantom lines between 0.415 µm to 0.605 µm). With the above-described configuration, as depicted in FIG. 7, for the conventional optical device, the optical mode is primarily confined in the Si waveguide section 710. Using the optical waveguide design tool, for the simulation of FIG. 7, an optical mode overlap with the III-V semiconductor material layer 714 (e.g., $\Gamma_{III-V\_conv}$) may be determined as 14.3%, and an optical mode overlap with the insulating layer (e.g., $\Gamma_{Al2O3\_conv}$), may be determined as 7.4%.

For the purpose simulation of FIG. 8, a portion of the optical waveguide 102 with 20 periods (e.g., having a Bragg grating section with 20 grooves) is analyzed with help of an optical waveguide design tool (e.g., FDTD by Lumerical). In FIG. 8, an X-axis 804 represents a length in microns, and a Y-axis 806 represents a height in microns. Further, a scale 808 represents optical power values in the multiples of $10^{-11}$. Also, for the purpose of simulation of FIGS. 8, W1, W2, L1, and L2 (see FIG. 3) are set to 500 nm, 300 nm, 273 nm, and 273 nm, respectively. In FIG. 8, the optical waveguide 104 is marked with phantom lines between 0.0 µm to 0.4 µm, the insulating layer is 0.4 µm to 0.415 µm, and the electrically conducting layer 130 is marked with phantom lines between 0.415 µm to 0.605 µm. With the above-described configuration, as depicted in FIG. 8, for the proposed optical device 102 with the Bragg grating, the optical mode is distributed well between the optical waveguide 104 and the electrically conductive layer 130. Using the optical waveguide design tool, for the simulation of FIG. 8, an optical mode overlap with the electrically conductive layer 130 (e.g., $\Gamma_{III-V}$) may be determined as 38%, and an optical mode overlap with the insulating layer 128 (e.g., $\Gamma_{Al2O3}$), may be determined as 11.6%, which is ~2 times higher than the conventional optical device described in FIG. 7. With such an increase in the optical mode overlap, an overall modulation efficiency also becomes more than 2 times higher compared to the conventional optical device (described in conjunction with FIG. 9).

Figure 9:
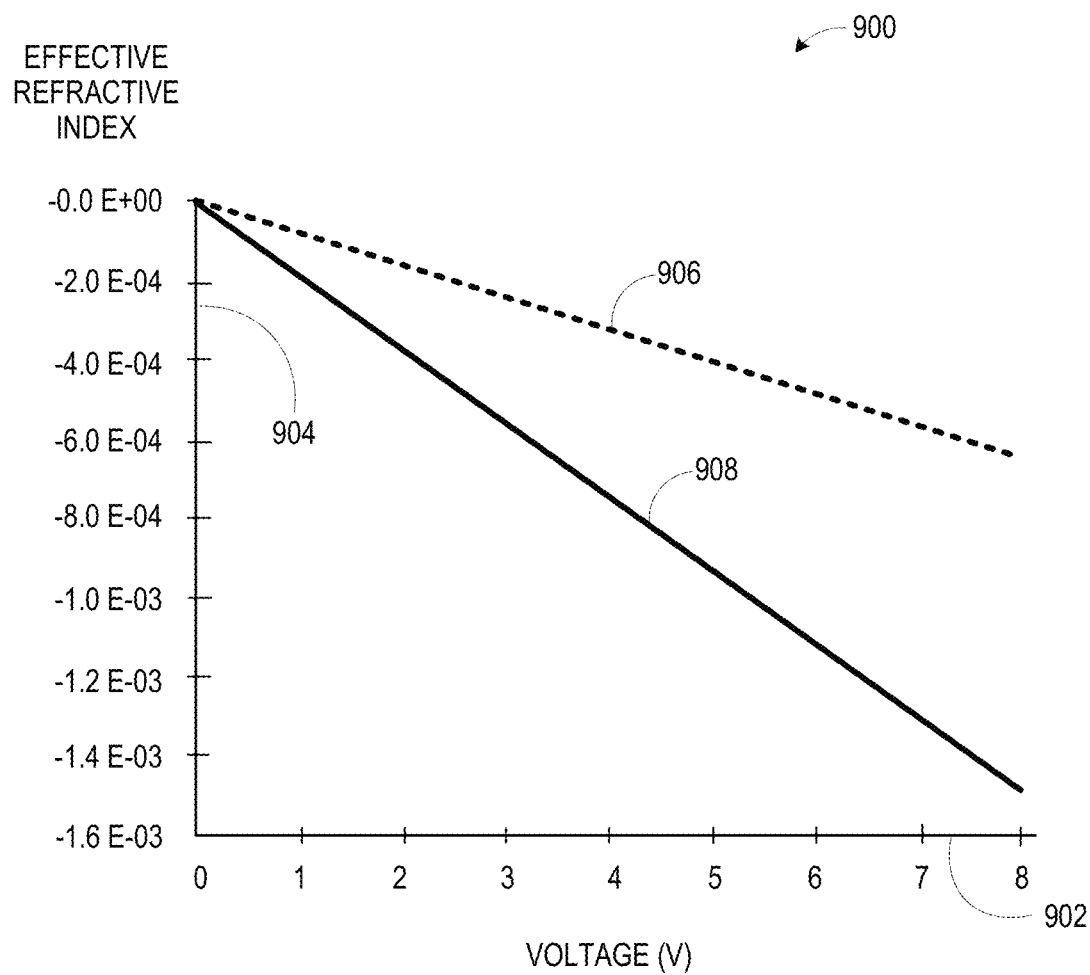
FIG. 9 is a graphical representation depicting simulated effective index change for an example optical device.

FIG. 9 is a graphical representation 900 depicting simulated effective refractive index change for an example optical device. The graphical representation 900 may be useful in evaluating the modulation efficiency of the proposed example optical device (e.g., the optical device 102) in comparison to a conventional optical device with MOSCAP phase shifter without grating (e.g., an optical device with the configuration described in FIG. 7, for example). In particular, in the graphical representation 900, an X-axis 902 represents voltage in volts (V), and a Y-axis 904 represents an effective refractive index. Further, a curve 906 represents a variation in the effective refractive index for the conventional optical device that does not include a waveguide with grating. Furthermore, a curve 908 represents a variation in the effective refractive index for an example optical device (e.g., the optical device 102) comprising an optical waveguide with Bragg grating.

To evaluate the modulation efficiency, the effective refractive index changes with the voltage, and the corresponding carrier density is simulated in optical waveguide design tools such as Lumerical MODE and CHARGE based on Soref's model. As observed in the graphical representation 900, the grating-assisted structure of the proposed optical device 102 may achieve about $2\times10^{-4}$ $V^{-1}$ index variation, which is about 2.5 times higher than the conventional one, due to the larger mode overlap of the optical mode with charge carrier-rich regions 148, 150 and lower electron mass in the electrically conductive layer 130 compared to the optical waveguide 104.

Further, in another example implementation of the optical device, such as the optical device 202 with the annular waveguide 206 of 15 μm radius, based on the simulation using the optical waveguide design tools, a resonance wavelength shift per voltage (Δλ/ΔV) may be determined as 68 μm/V. Further, a modulation efficiency corresponding to the resonance wavelength shift per voltage may be determined as $$V_\pi L = \frac{FSR \cdot L}{2} \frac{\Delta V}{\Delta \lambda} = 0.35 \ V \cdot cm,$$

where FSR is the free spectral range which is a spacing in optical frequency or wavelength between two successive transmitted optical intensity minimums. In the present example, the FSR is 5 nm. Further, L is a circumferential length of the annular waveguide 206. In the present example, L is 94.2 μm (e.g., 2×π×15 μm). Compared to a microring resonator-based conventional optical device that has a modulation efficiency of 0.86 V·cm, the modulation efficiency of the grating-assisted example optical device 202 of FIG. 2 is more than double.

Figure 10:
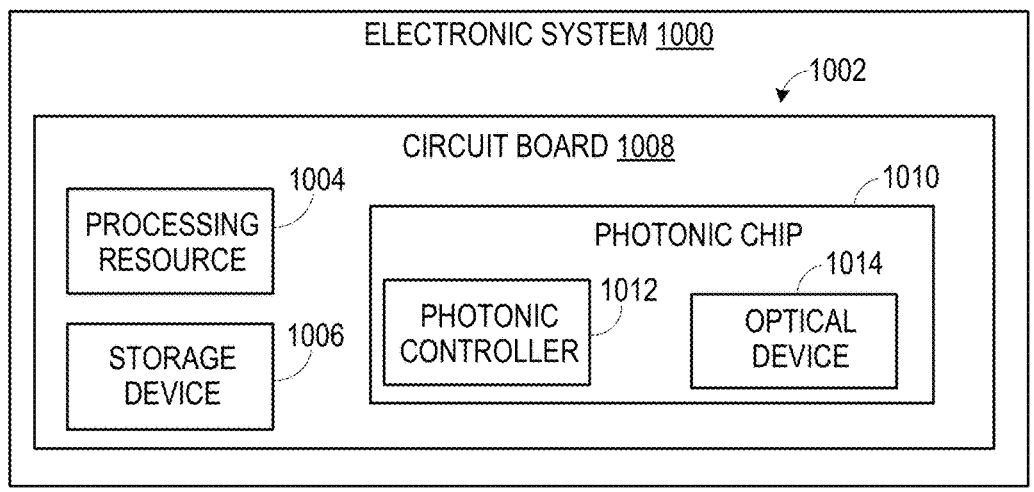
FIG. 10 depicts a block diagram of an example electronic system hosting an example optical device.

Referring now to FIG. 10, a block diagram of an example electronic system 1000 is presented. Examples of the electronic system 1000 may include, but are not limited to, computers (stationary or portable), servers, storage systems, wireless access points, network switches, routers, docking stations, printers, or scanners. The electronic system 1000 may be offered as a stand-alone product, a packaged solution, and can be utilized on a one-time full product/solution purchase or pay-per-use basis. The electronic system 1000 may include one or more multi-chip modules, for example, a multi-chip module (MCM) 1002 to process and/or store data. In some examples, the MCM 1002 may include a processing resource 1004 and a storage medium 1006 mounted on a circuit board 1008. Also, in some examples, the MCM 1002 may host a photonic integrated circuit 1010 on the circuit board 1008. In some other examples, one or more of the processing resource 1004, the storage medium 1006, and the photonic integrated circuit 1010 may be hosted on separate MCM (not shown). The circuit board 1008 may be a printed circuit board (PCB) that includes several electrically conductive traces (not shown) to interconnect the processing resource 1004, the storage medium 1006, and the photonic integrated circuit 1010 with each other and/or with other components disposed on or outside of the PCB.

The processing resource 1004 may be a physical device, for example, one or more central processing units (CPUs), one or more semiconductor-based microprocessors, microcontrollers, one or more graphics processing unit (GPU), application-specific integrated circuit (ASIC), a field-programmable gate array (FPGA), other hardware devices, or combinations thereof, capable of retrieving and executing the instructions stored in the storage medium 1006. The processing resource 1004 may fetch, decode, and execute the instructions stored in the storage medium 1006. As an alternative or in addition to executing the instructions, the processing resource 1004 may include at least one integrated circuit (IC), control logic, electronic circuits, or combinations thereof that include a number of electronic components. The storage medium 1006 may be any electronic, magnetic, optical, or any other physical storage device that contains or stores instructions that are readable and executable by the processing resource 1004. Thus, the storage medium 1006 may be, for example, Random Access Memory (RAM), non-volatile RAM (NVRAM), an Electrically Erasable Programmable Read-Only Memory (EEPROM), a storage device, an optical disc, and the like. In some embodiments, the storage medium 1006 may be a non-transitory storage medium, where the term "non-transitory" does not encompass transitory propagating signals.

Further, in some examples, the photonic integrated circuit 1010 may include a photonics controller 1012 and one or more photonic devices such as the optical device 1014. The optical device 1014 may be an example representative of any of the optical device 102 of FIG. 1 or the optical device 202 of FIG. 2. For illustration purposes, in FIG. 6, the photonic integrated circuit 1010 is shown to include a single optical device 1014. The use of a different number of optical devices or the use of several different types of optical devices in the photonic integrated circuit 1010 is also envisioned within the scope of the present disclosure. For example, the photonic integrated circuit 1010 may also include other photonic devices such as but not limited to, optical converters, optical cables, waveguides, optical modulators (e.g., ring modulator), optical demodulators (e.g., ring demodulator), resonators, light sources (e.g., lasers), or the like. The photonic integrated circuit 1010 may function as an optical transmitter, optical transceiver, optical communication and/or processing medium for the data and control signals (e.g., control voltages) received from the photonics controller 1012. Non-limiting examples of the photonics controller 1012 may be implemented using an IC chip such as, but not limited to, an ASIC, an FPGA chip, a processor chip (e.g., CPU and/or GPU), a microcontroller, or a special-purpose processor. During the operation of the electronic system 1000, the photonics controller 1012 may apply control voltage (e.g., the control voltage (Vc)) to control phase shifts applied to the optical signal passing through the optical device 1014.

Figure 11:
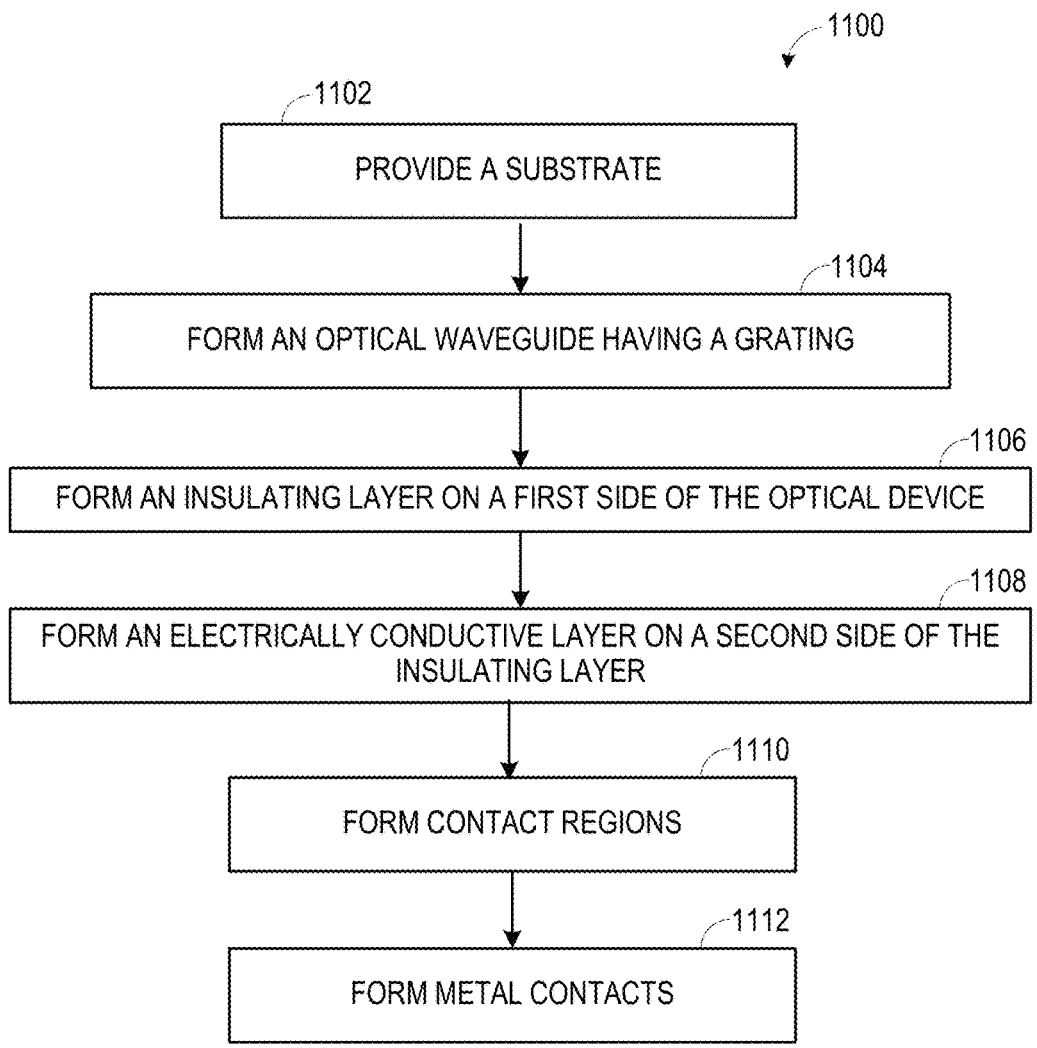
FIG. 11 depicts a flow diagram of an example method for fabricating an example optical device.

FIG. 11 depicts an example method 1100 of forming an optical device. For illustration purposes the method 1100 is described in conjunction with FIG. 1, however, the method steps described herein may also apply to other example optical devices described hereinabove.

At block 1102, a substrate is provided. The substrate may be SOI substrate (e.g., the substrate 106) in one example. Further at block 1104, an optical waveguide (e.g., the optical waveguide 104) is formed. In some examples, the optical waveguide may be formed in a device layer (e.g., the device layer 122) of the SOI substrate by suitably shaping the device layer, for example, via techniques such as photolithography and etching. In particular, forming the optical waveguide includes forming a grating (e.g., the grating 132) along a length of the optical waveguide. Forming the grating includes forming a plurality of parallel ridges (e.g., the ridges 134) in the device layer to alternately create first optical waveguide sections and second optical waveguide sections in the device layer. In some examples, the grating is formed such that, in the first optical waveguide sections, the optical waveguide is wider than in the second optical waveguide sections. The grating may be formed by chemically or mechanically etching out portions from the device layer.

Further, at block 1106, an insulating layer (e.g., the insulating layer 128) may be formed on a first side (e.g., the first side 112 depicted in FIGS. 4-5) of the optical waveguide. In particular, in one example, the insulating layer may be formed on top of the optical waveguide using thermal growth techniques and/or using deposition techniques, such as, chemical vapor deposition (CVD), for example.

Furthermore, at block 1108, an electrically conductive layer (e.g., the electrically conductive layer 130) may be formed on a second side (e.g., the second side 116 depicted in FIGS. 4-5) of the insulating layer. In particular, in some examples, the electrically conductive layer may be made of a III-V semiconductor layer that may be formed on top of the insulating layer. The III-V semiconductor layer may be formed using epitaxial growth, deposition techniques (e.g., CVD), wafer bonding, transfer printing, or combinations thereof. In particular, techniques such as epitaxial growth and/or wafer bonding of the III-V semiconductor layer facilitate planar heterogeneous integration of other device structures such as lasers, modulators, and photon detectors all on a common substrate (e.g., the substrate 106). Further, once the III-V semiconductor layer is formed, the impurity doping may be performed to inject free charge carriers into the III-V semiconductor layer. In one example, the III-V semiconductor layer may be dopped to have different types of charge carriers as compared to the optical waveguide. For example, as depicted in FIG. 3, the III-V semiconductor layer may include n-type doping injected using techniques such as diffusion and ion implantation.

As previously described, the optical waveguide, the insulating layer, and the electrically conductive layer form a waveguide integrated capacitor (e.g., the waveguide integrated capacitor 101). In particular, the waveguide integrated capacitor is formed via the optical waveguide, an insulating layer, and an electrically conductive layer, such that the insulating layer is sandwiched between the optical waveguide and an electrically conductive layer. During the operation of the optical device, the grating formed in the optical waveguide causes an optical mode of an optical signal passing through the optical waveguide to overlap with the optical waveguide and the electrically conductive layer thereby resulting in an enhanced modulation efficiency via the waveguide integrated capacitor Moreover, in some examples, at block 1110, one or more contact regions (e.g., contact regions 140, 142) may be formed. For example, the contact region 140 may be formed in the device layer 122 and in contact with the optical waveguide in the first optical waveguide sections 136. In particular, in some examples, the contact region 140 may not be formed in direct contact with the optical waveguide in second optical waveguide sections 138. The contact regions 140 may be formed by doping a defined region of the device layer with the first-type doping and etching-out portions of the device layer (except in the width W2) from the second optical waveguide sections 138. Further, the contact region 142 is formed in the electrically conductive layer. In some examples, The contact regions may be formed using techniques such as, but not limited to, thermal growth, CVD, wafer bonding, molecular beam epitaxy (MBE), and/or performing doping of respective regions with suitable impurities. For example, the contact regions 140 and 142 are doped to include the first-type doping (e.g., p-type) and the second-type doping (e.g., n-type), respectively.

Further, in some examples, at block 1112, metal contacts such as the metal contacts (e.g., metal contacts 144 and 146) may be formed in electrical contact with the contact regions 140 and 142, respectively. In some examples, to form the metal contacts, the insulating layer may be etched or lithographically defined to form respective vias until the respective regions such as the contact regions are reached. Once the vias are formed, a conducting material (e.g., metal) is filled into the vias to form the metal contacts.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled to" as used herein, is defined as connected, whether directly without any intervening elements or indirectly with at least one intervening element, unless indicated otherwise. For example, two elements may be coupled to each other mechanically, electrically, optically, or communicatively linked through a communication channel, pathway, network, or system. Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described. Moreover, method blocks described in various methods may be performed in series, parallel, or a combination thereof. Further, the method blocks may as well be performed in a different order than depicted in flow diagrams.

Further, in the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. An optical device comprising:
an optical waveguide comprising a grating formed along a length of the optical waveguide, wherein the optical waveguide is an annular resonator, and wherein the length of the optical waveguide is a circumferential length of the optical waveguide;
an insulating layer formed on a first side of the optical waveguide, wherein a first side of the insulating layer is disposed proximate to the first side of the optical waveguide; and
an electrically conductive layer formed on a second side of the insulating layer, wherein the optical waveguide, the insulating layer, and the electrically conductive layer form a waveguide integrated capacitor, wherein the grating in the optical waveguide causes an optical mode of an optical signal passing through the optical waveguide to overlap with the optical waveguide and the electrically conductive layer thereby resulting in an enhanced modulation efficiency via the waveguide integrated capacitor.

2. The optical device of claim 1, wherein the optical waveguide is made of a semiconductor material, wherein the grating comprises a plurality of parallel ridges of the semiconductor material, and wherein the semiconductor material comprises a first type doping.

3. The optical device of claim 2, wherein a spacing between adjacent ridges of the plurality of parallel ridges is uniform.

4. The optical device of claim 3, wherein the semiconductor material is Silicon.

5. The optical device of claim 1, wherein the optical device is disposed in an optical transceiver.

6. The optical device of claim 5, wherein the optical transceiver is disposed in a server, a storage device, a router, a network switch, or an access point.

7. The optical device of claim 1, wherein the electrically conductive layer is a semiconductor material comprising a second-type doping.

8. The optical device of claim 1, wherein the electrically conductive layer is a III-V semiconductor material comprising a second-type doping.

9. The optical device of claim 1, wherein the optical waveguide, due to the presence of the grating, comprises alternately formed first optical waveguide sections and second optical waveguide sections.

10. The optical device of claim 9, wherein the optical waveguide, in the first optical waveguide sections, is wider than in the second optical waveguide sections.

11. An electronic system, comprising:
a processing resource;
a storage medium communicatively coupled to the processing resource; and
a photonic integrated circuit communicatively coupled to the processing resource and comprising an optical device, wherein the optical device comprises:
an optical waveguide comprising a grating formed along a length of the optical waveguide, wherein the optical waveguide is an annular resonator, and wherein the length of the optical waveguide is a circumferential length of the optical waveguide;
an insulating layer formed on a first side of the optical waveguide, wherein a first side of the insulating layer is disposed proximate to the first side of the optical waveguide; and
an electrically conductive layer formed on a second side of the insulating layer, wherein the optical waveguide, the insulating layer, and the electrically conductive layer form a waveguide integrated capacitor, wherein the grating in the optical waveguide causes an optical mode of an optical signal passing through the optical waveguide to overlap with the optical waveguide and the electrically conductive layer thereby resulting in an enhanced modulation efficiency via the waveguide integrated capacitor.

12. The electronic system of claim 11, wherein the optical waveguide, due to the presence of the grating, comprises alternately formed first optical waveguide sections and second optical waveguide sections, and wherein the optical waveguide, in the first optical waveguide sections, is wider than in the second optical waveguide sections.

13. The electronic system of claim 11, wherein the optical waveguide is made of a semiconductor material, wherein the grating comprises a plurality of parallel ridges of the semiconductor material, and wherein the semiconductor material comprises a first type doping.

14. The electronic system of claim 11, wherein the electrically conductive layer is a III-V semiconductor material comprising a second-type doping.

15. A method of fabricating an optical device, comprising:
providing a substrate comprising a device layer;
forming an optical waveguide in the device layer, wherein forming the optical waveguide comprises forming a grating along a length of the optical waveguide, wherein the optical waveguide is an annular resonator, and wherein the length of the optical waveguide is a circumferential length of the optical waveguide;
forming an insulating layer on a first side of the optical waveguide, wherein a first side of the insulating layer is disposed proximate to the first side of the optical waveguide; and
forming an electrically conductive layer on a second side of the insulating layer, wherein the optical waveguide, the insulating layer, and the electrically conductive layer form a waveguide integrated capacitor, wherein the grating in the optical waveguide causes an optical mode of an optical signal passing through the optical waveguide to overlap with the optical waveguide and the electrically conductive layer thereby resulting in an enhanced modulation efficiency via the waveguide integrated capacitor.

16. The method of claim 15, wherein forming the grating comprises forming a plurality of parallel ridges in the device layer to alternately create first optical waveguide sections and second optical waveguide sections in the device layer.

17. The method of claim 16, wherein the optical waveguide, in the first optical waveguide sections, is wider than in the second optical waveguide sections.

* * * * *